Figure 1:
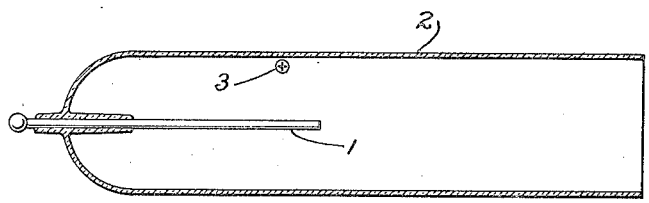

Oct. 8, 1935.   L. T. JONES   2,016,437

LUMINESCENT TUBE

Filed Sept. 5, 1928

INVENTOR.
Lloyd T. Jones.
BY Townsend, Loftus & Ahlett
ATTORNEYS.

Patented Oct. 8, 1935

2,016,437

UNITED STATES PATENT OFFICE 2,016,437

LUMINESCENT TUBE

Lloyd T. Jones, Berkeley, Calif.

Application September 5, 1928, Serial No. 304,083

3 Claims. (Cl. 176—126)

This invention relates to luminescent tubes and especially to the electrode structure thereof.

It is well known in the art of luminescent tube electric sign construction and in the previous allied art of vacuum tube and spectral tube construction that very deleterious effects are encountered which depend upon the peculiar and little known characteristics of behavior of gases and metals when taking part in electric discharge at pressures considerably less than atmospheric. When a rarefied gas is thus present in an electric discharge between two electrodes it has long been observed that particles of the electrode sputter against the glass walls of the container and that this phenomenon is accompanied by the disappearance of the gas contained in the tube. The manner in which the gas is entrapped by the sputtered particles is little known, the literature of physics failing to adequately describe it.

The inability to control the sputtering of electrodes and the consequent disappearance of the gas which it is desired to retain has thus far limited luminescent tube construction to tubes containing the inert gases: neon, helium, argon etc., it being well known that far less difficulty is encountered by the use of these gases. It is further known that the sputtering and consequent disappearance of the gases is a function of the current density at the electrodes. It was the discovery of Georges Claudè that when the electrodes present an area exceeding 1.5 square decimeters per ampere of current the sputtering of the electrodes and the disappearance of the gas both become negligible. Although many efforts have been made to produce satisfactory luminescent tubes by utilizing an electrode of area less than this critical amount the results have not been encouraging.

The present mechanism is based upon a theory of the action by which the gases are entrapped during the process of sputtering. The fact that by using electrodes of the character described herein luminescent tubes of satisfactory length of life have been constructed can hardly be termed a verification of the theory but it is evident that the problem has been solved insofar as its commercial application to the art of luminescent tube construction is concerned. This is all the more evident when it is found that by this means it is possible to utilize the active gases such as hydrogen and at the same time use an electrode area far less than the critical value of 1.5 square decimeters per ampere. In particular I have constructed a luminescent tube containing hydrogen which is known to be the least satisfactory of the gases because of its violent sputtering, the tube having tungsten electrodes of area only 0.40 square decimeter per ampere. It is also to be remembered that tungsten is one of the least satisfactory if indeed not the most unsatisfactory metal to use as an electrode. The use of tungsten and hydrogen were deliberate in proving to my satisfaction that the difficulty is relieved by this invention.

Figure 2:
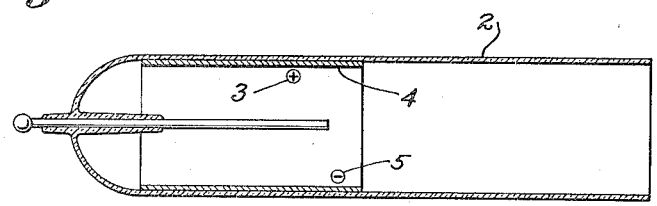
Figure 3:
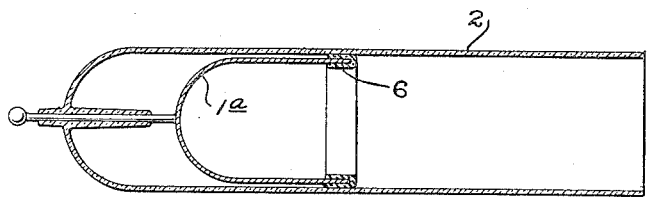

The manner in which the electrode functions to avoid the serious defects of previous electrodes is best understood by referring to the accompanying drawing, in which:

Fig. 1 is a sectional view of a luminescent tube, said sectional view being presented merely for the purpose of explaining the theory upon which the tube functions, Fig. 2 is a sectional view of a luminescent tube showing my improved form of electrode and shield member inserted therein, Fig. 3 is a similar section showing a modified form of the electrode and shield member.

In Fig. 1 a wire 1, which also constitutes the electrode in this case, is sealed through the end of a luminescent tube 2. A similar electrode may be considered present at the opposite end of the tube. A metallic particle 3 is represented as having been sputtered from the electrode 1 against the glass tube 2. If this particle is projected with sufficient speed as is actually the case it will penetrate or otherwise adhere to the glass wall of the tube. If it be electrically charged its electrical charge is thus fastened to the glass and since the particle is not free to move and the glass is electrically non-conducting the charge must remain. This charge may act in either of two ways. If a gas molecule or atom of opposite electrical charge comes sufficiently near the charged metal particle it will be attracted and eventually held electrostatically to the metal particle. This electrical attraction is known to be the means by which all particles are held together to form a body such for example as a piece of steel. It is readily seen then that this holding force is sufficiently great to permanently hold the gas molecule. Since the metal particle cannot leave, the gas molecule is permanently held in position and the gas pressure in the tube is thereby lowered by a corresponding amount.

The second way the electrically charged metal particle may act is by a gas molecule approaching the exterior surface of the tube and being held as closely as possible to the metal particle which is inside the tube. It is readily seen that this binding together of the charges is less intimate than in the preceding case but nevertheless such does occur as is evidenced by the fact that sometimes sufficient charges accumulate on the outside of the tube that the electric field which is thus produced through the glass becomes sufficient to puncture the glass.

Fig. 2 shows a shield member 4 which surrounds the electrode 1. If the shield 4 be an electrically conducting material such as a metal cylinder it is readily seen that the metal particles will strike this metallic surface and be prevented from accumulating on the surface of the glass. It is further evident that the sputtered metal particle 3 may be electrically neutralized by a gas molecule 5 which strikes the cylinder at a remote point and furthermore that the gas molecule is not thereby entrapped.

It is not necessary that the shield member shall be electrically conducting in order to provide at least partial relief from the difficulties encountered through sputtering of the electrodes. It is possible to provide the member 4 of insulating material and to allow it to become a conductor by virtue of the sputtered particles it receives during use.

By referring to Fig. 3 it will be noted that a tubular form of metallic electrode is employed, as indicated at 1a. This electrode fits the interior of the glass tube 2 sufficiently close that no appreciable electric discharge from the outside of the electrode will occur. The shielding member employed in the present instance is indicated at 6. It consists of a coating of insulating material, such as enamel or the like, this coating being applied both to the exterior and interior surfaces of the electrode at the open end thereof, the enamel coating extending within the tube a sufficient distance to prevent most of the sputtered particles that arise within the cylinder from striking the glass wall of the tube.

While a rod-like electrode is shown in Fig. 2, it is possible that a tubular electrode may be employed, but it is of course essential that its diameter shall be less than the diameter of the shielding tube 4.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:

1. In a luminescent tube of the character described employing a gas pressure exceeding 4.0 mm., a pair of rod shaped electrodes, a pair of metallic tubular shield members, one for each electrode and interposed between the tube and the electrodes, said shield members being insulated with relation to the adjacent electrodes and spaced therefrom, and having a length greater than the electrodes.

2. In a luminescent tube employing a gas pressure exceeding 4.0 mm., an electrode and a metallic tubular shaped shield member interposed between the tube and the electrode, said shield member being insulated with relation to the electrode and spaced therefrom and extending beyond the free end of the electrode.

3. In a luminescent tube employing a gas pressure exceeding 4.0 mm., a pair of electrodes, a pair of metallic tubular shield members, one for each electrode and interposed between the tube and the electrodes, said shield members being insulated with relation to the adjacent electrodes and spaced therefrom, and said shield members extending beyond the free ends of the electrodes.

LLOYD T. JONES.